Aug. 10, 1954
F. W. MEREDITH ET AL
2,686,285
MULTIPLE CHANNEL SAFETY CONTROL
FOR AUTOMATIC AIRCRAFT PILOTS
Filed Aug. 18, 1949
8 Sheets-Sheet 1
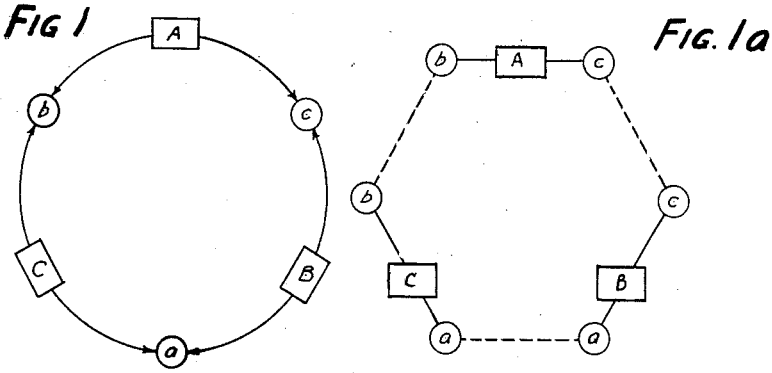
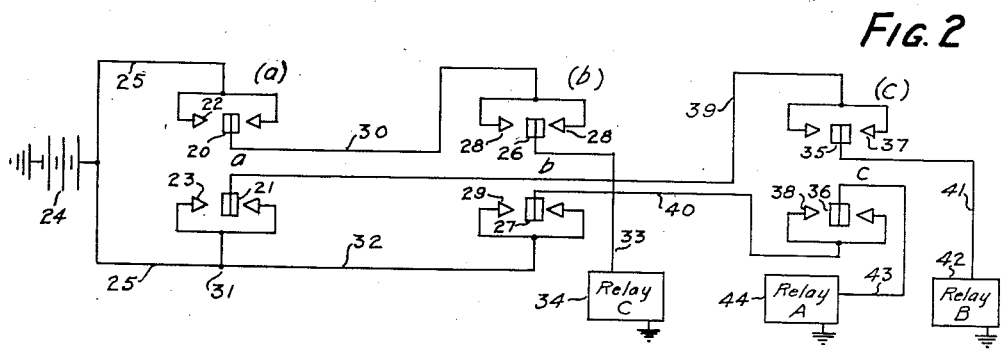
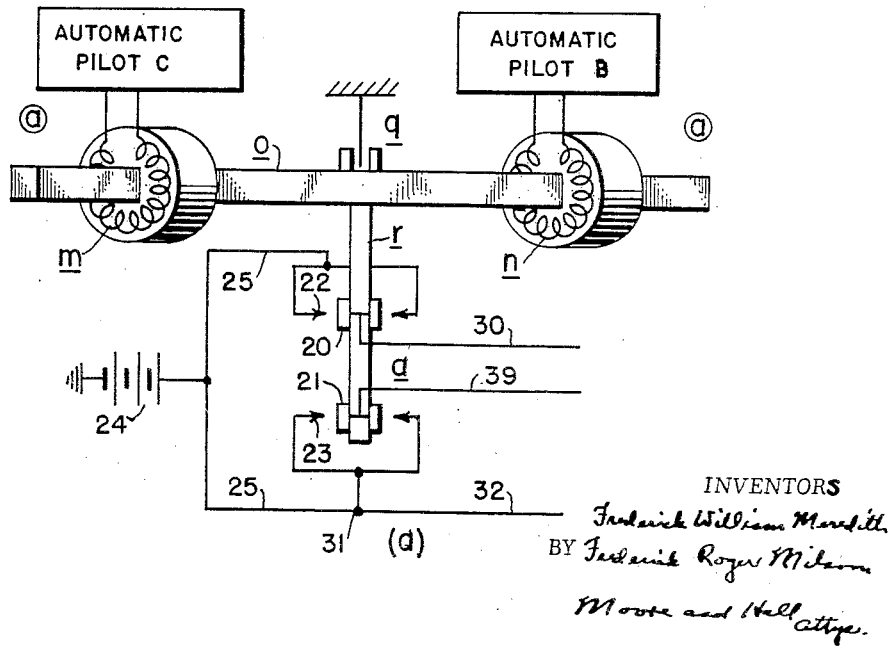
INVENTORS
Frederick William Meredith
BY Frederick Roger Milsom
Moore and Hall
attys.

INVENTORS
FREDERICK WILLIAM MEREDITH
FREDERICK ROGER MILSOM

BY *Moore & Hall,*

ATTORNEYS

Aug. 10, 1954

F. W. MEREDITH ET AL
MULTIPLE CHANNEL SAFETY CONTROL
FOR AUTOMATIC AIRCRAFT PILOTS 2,686,285

Filed Aug. 18, 1949

INVENTORS
Frederick William Meredith
Frederick Roger Milan

BY Moore and Hall

ATTORNEYS

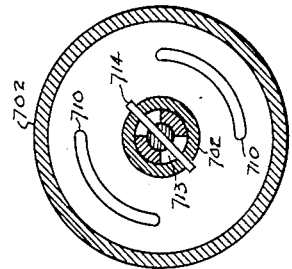
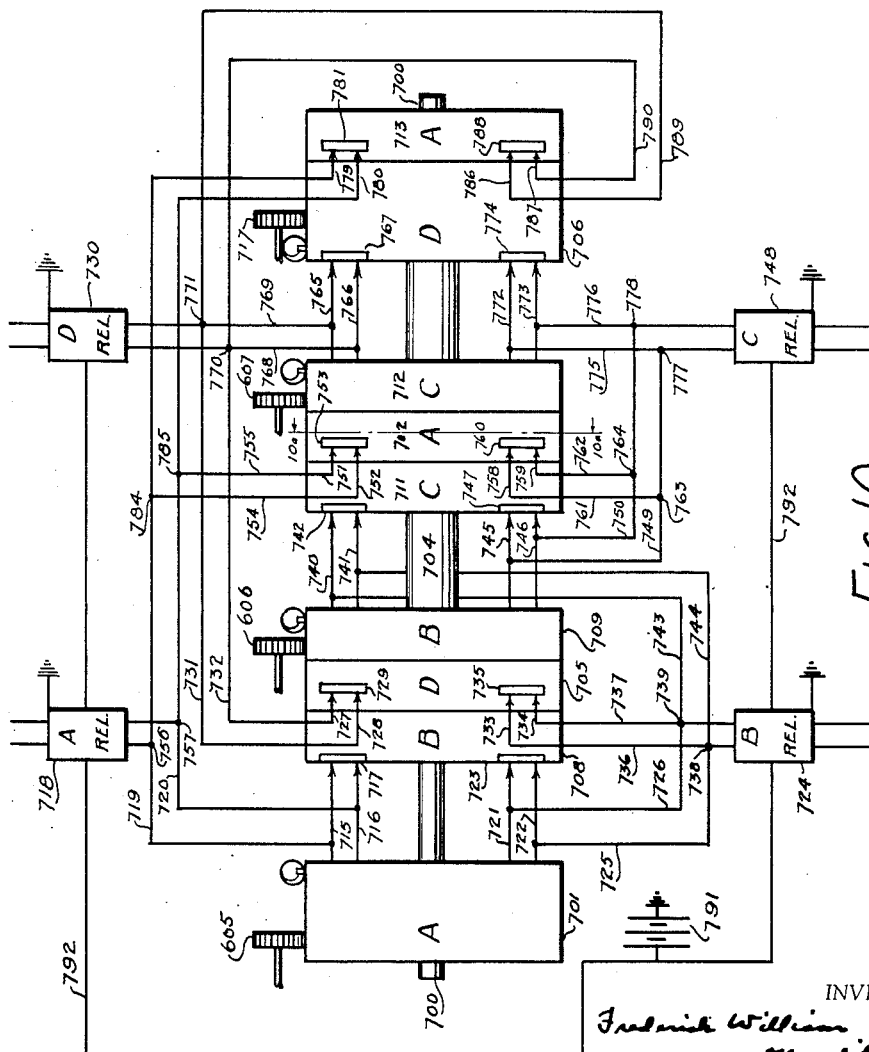

Patented Aug. 10, 1954

2,686,285

UNITED STATES PATENT OFFICE 2,686,285

MULTIPLE CHANNEL SAFETY CONTROLS FOR AUTOMATIC AIRCRAFT PILOTS

Frederick William Meredith, Cheltenham, and Frederick Roger Milson, London, England Application August 18, 1949, Serial No. 111,034

18 Claims. (Cl. 318—489)

The present invention concerns error detection and suppression in automatic pilot control for aircraft and related movable craft operating in three dimensions for reference data purposes in which are supplied a plurality of similar independent controls for any function in which the probability of failure is desired to be very small.

It is an object of the invention to compare related or ideally identical control data in automatic pilots for aircraft and to provide means for detecting an error in one or more of a plurality of control systems and eliminating from the control function those systems in which error is detected.

It is an object of the invention to test for error in an aircraft automatic pilot control system by comparing the signals therefrom with the signals from two or more equivalent systems operating under the same or equivalent conditions to produce ideally identical data.

It is an object of the invention to compare the signals from three or more automatic control systems for movable craft and eliminate those signals which differ most widely from the average or other selected value.

While the invention is intended to be applicable to movable craft such as submarines, guided missiles, rockets and related craft movable in three dimensions under automatic control where failure of equipment must be minimized for operational purposes or to eliminate as far as possible the dangers of disaster-failure and the attendant loss of life of passengers and operating personnel, for illustrative purposes it will be considered in its application to automatic airplane pilots.

As the speed of flight increases and the permissible time for performing the functions of piloting decreases a point is reached where the reaction time of a pilot becomes a critical factor. This coupled with the increasing complexity of controls and instrumental data to be observed and interpreted are causing the human factor to become the weakest link in the piloting system. Even where controls are simplified in the extreme by more and more automatic equipment, the increase of plane speeds will eventually make necessary completely automatic piloting equipment in which it may well be too dangerous to have the human pilot intervene and take over command of flight functions. Human reaction time may well be longer than the time available as speeds increase.

There is also the problem of the physical effort required to control a plane. As sizes and speed increase the actual force required to operate a control may exceed that of which the average pilot is capable. Power assist equipment is therefore required and the pilot is at their mercy even when he has taken over control.

Under these conditions failure of a piloting system can only mean failure and wash out of the entire plane. It will no longer answer the problem to construct a pilot system which will fail to safety because a human pilot will have too large a factor of inherent error to take over.

It can be assumed that a carefully designed and constructed piloting system has an error probability of one in a million. This is still not safe enough to commit a plane and its occupants irrevocably to its control. Where two such systems are employed, each independently capable of performing the required function, the likelihood of simultaneous failure may be taken as of the order of the products of the separate error probabilities or $10^{12}$.

Where the failure of one of such systems is complete in the sense that it produces no signal at all a direct combination is possible as one signal could function in the absence of the other.

A more difficult and more likely problem is posed by two signals from two separate systems, one of which is in error. It is an object of the invention to solve this problem in one of two ways which may be regarded from one point of view as basically different.

One solution may parallel the complete failure no-signal example by establishing a plurality of voltage or pressure check points in a system which points are standard in that they have a fixed value or vary in a determinable manner. When one of these check points departs from what has been determined as a standard to a degree which is regarded as unsafe, the system containing the check point found in error is eliminated from the control function by suitable switching or valving action. This method is applicable to variations in standard voltage supplies or component failure such as tube burnout in certain cases, control motor failure and the like where a definite performance can be expected independent of the pilot data per se. It can be readily seen that it is of limited application and the results are not comprehensive. It must be treated as a partial solution of a general problem which is applicable in special cases. Within the limitations imposed it can present a satisfactory solution to certain problems.

Another and preferred solution of the problem is to provide three or more independent systems or system portions and compare the results or signals of the various units. Where one unit differs from two which are in agreement the differing signal is assumed to be in error and is eliminated from control function. A saving in weight or other advantages such as the ability to continue an operation with safety after a single failure has occurred with perhaps some increase in error probability may be obtained by providing four or more units of smaller size, any two, three or more of which could actuate the desired control. The term signal is here used generically to include any indication, action or change utilized by an automatic control system to initiate, to correct or to supervise control of a movable craft. The term signal is intended to cover fluid pressure, current, voltage, phase relation, a change in state, physical, chemical or other reaction and the like.

Reference is had to the drawings which are intended to be illustrative of several forms the invention may take and are not to be taken as limiting. Like numerals refer to like parts throughout.

Fig. 1 is a schematic diagram showing the relation of three interlocking control systems which may be hydraulic, electrical, mechanical or have some other basis of operation.

Fig. 1a is a schematic diagram showing the relation of error indication means when an error in one system yields two indications of error, one between it and each of the other two related systems by differential comparison means. The presence of a differential signal indicates an error in one of the systems being compared.

Fig. 2 is a schematic circuit diagram for error detection and elimination which may be employed in any system in which a single error leads to two indications of error.

Fig. 3 is a detail showing of one manner of utilizing the elimination circuit of Fig. 2 with the differential comparison arrangement of Figs. 1 and 1a.

Fig. 10 is one form of four system control.

Fig. 10a is sectional view along line 10 of Fig. 10.

Figure 4:
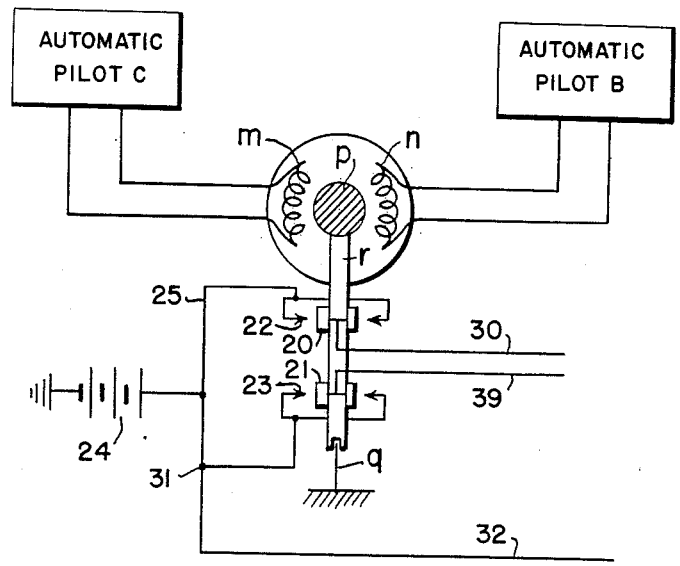
Fig. 4 is a modification of Fig. 3.

It is to be understood that the invention is adapted to power assist equipment for piloting forming part of or constructed to supersede a plurality of automatic pilots or parts thereof. As planes increase in size the sheer physical effort required for control goes beyond the strength of an individual, particularly over any extended period of time. This is of course without reference to reaction time. In many cases the weight alone necessary for static balance of a control surface is so large that the use of servos and low pitch worm drives yields a substantial gain in efficiency. Failure of power assist equipment should be of the same order of magnitude as failure of a control surface.

Reference is made to Smith's Controlled Flight System, SAI/FP108, published September 1948 in England for pilot details developed in large part by applicants and referred to herein. The gate fold at page 12 shows a schematic diagram of an electric control system. The gyro unit is discussed on pages 14 et seq., the servo-motors and amplifier unit on pages 17 et seq., and the signal system on pages 25 et seq. The above is incorporated herein by reference for a more detailed description of a pilot system which may be employed in the present invention. A copy of the above publication is available in the U. S. Patent Office Library.

The arrangement of Fig. 1 represents schematically three controls which independently determine the correct action to control a movable craft and which furnish data to perform a desired function such as a computed setting for the rudder, the ailerons or the elevators of an aircraft. The separate systems A, B and C are supplied with error detection means $a$, $b$ and $c$ respectively. Error detection means $a$ is connected to compare a signal for a given correction, i. e. rudder displacement of five degrees starboard, independently determined by automatic pilot system B and C. If both systems B and C indicate the same displacement the signals from systems B and C will balance in differential measuring error detector $a$ and yield a zero resultant. If the signals from systems B and C are not equal detector $a$ will show a resultant which represents a difference in the rudder or aileron settings determined by systems B and C. Where this difference is within an acceptable tolerance the two determinations can be averaged, but when the difference yields too large a resultant at differential means $a$ it is assumed that at least one of the systems B and C is in error. In the same way differential means $b$ compares systems A and C while means $c$ compares systems A and B. Means $a$, $b$ and $c$ may take the form of normally open contacts as shown in the circuit of Fig. 2. When all the contacts 20, 21, 26, 27 and 35, 36 are open the relays A, B and C are inactice and all three automatic pilot systems A, B and C are operative. Differential measuring means $a$ is connected to systems B and C. When the two signals from the systems B and C balance contacts 20 and 21 remain open as shown in Fig. 2. When systems B and C are unbalanced the resultant signal acting through a suitable coil and armature closes contacts 20 and 21. Whether system B or C is giving the unique erroneous signal which differs from the signal of other systems is determined by the action of the differential measuring means $b$ and $c$. Differential means $b$ is connected to systems A and C in the same manner and means $c$ is connected to systems A and B. If differential $b$ shows a resultant which closes contacts 26 and 27, the circuit to relay 34 is closed and system C is isolated as being in error. In the same way if differential means $c$ has a resultant signal from the comparison of systems A and B the system B is isolated by the operation of relay 42.

In general error detecting means may detect any signal occurrence or lack of signal occurrence. Fig. 1a shows the schematic relation where the single occurrence of error gives rise to two signals. This effect follows from comparing a unique signal with two similar signals. For normal operation systems A, B and C all give substantially the same signal. This sameness is constantly established by continually comparing the signals A—B; A—C and B—C. If system A suddenly gives a signal of one value and systems B and C give a signal of another value then the comparison B—C remains in balance, but both comparisons A—B and A—C are out of balance and yield two indications of the single failure A.

For concrete application in the present disclosed forms the couples $a$—$a$, $b$—$b$ and $c$—$c$ could be torque motors with their rotors on the same spring biased shaft or each couple could represent a differential three-phase voltmeter. The resultant movement of any two of the three spring biased shafts would serve to close the respective contacts.

As shown in Figs. 1a and 3, a torque motor $a$—$a$ comprising two coils $m$ and $n$ and movable armature or connecting shaft $p$ perform the differential comparison. The coil $m$ is connected to receive a signal from pilot C, e. g. a voltage representing a rudder deflection of five degrees. The coil $n$ connected to pilot B should receive the same signal voltage indicating the same rudder deflection within reasonably close tolerances. If the signals from automatic pilot systems B and C are the same, the currents flowing in coils $m$ and $n$ and the forces on armature $o$ are the same, but oppositely directed. As the equal forces exerted by the signal currents in coils $m$ and $n$ cancel each other armature $o$ remains in normal position with contacts 20, 22 and 21, 23 open under the centering action of restoring spring $q$. In the event the signal voltages from pilots B and C are sufficiently unequal to yield a resultant force armature $o$ is moved one way or the other depending upon which coil receives the larger voltage signal until the contacts 20, 22 and 21, 23 are closed. This is of course a small distance and the forces and currents involved are likewise small. Armature $o$ may move either longitudinally in translation, as shown in Fig. 3, or may rotate about its axis as a shaft depending upon the winding of the coils $m$ and $n$. The coils $m$ and $n$ in Fig. 3 are wound as simple helices to form solenoids giving longitudinal movement of an eighth or a quarter of an inch to the contact arm $r$. If the coils $m$ and $n$ are wound for rotation, armature $o$ is made round and becomes a shaft, as shown in Fig. 4, which rotates through a small angle against the action of a restoring spring $q$. The coils $m$ and $n$ which have been shown separate and spaced apart in Fig. 3 for simplicity would actually be combined in the same little solenoid or in a torque motor as shown in Fig. 4. The structures of Figs. 3 and 4 may be used alone, independently of Fig. 2 for comparing a single voltage with a standard value by connecting a grounded relay to either wire 30 or 39.

Referring to Fig. 2, the system A may be arranged to displace armatures or switch arms 26, 27 and 35, 36 in respective pairs by the action of the spring biased shaft mentioned above, a coil and armature or the like actuated by differential means $b$ and $c$ in the event failure occurs. This action closes contacts 28, 29, 37 and 38, leaving contacts 22 and 23 open.

System B is arranged to displace switch arms 20, 21 and 35, 36 in the event of failure by the similar movement of the actuating parts of differential means $a$ and $c$. The action closes contacts 22, 23 and 37, 38.

System C is similarly arranged to displace switch arms 20, 21 and 26, 27 closing contacts 22, 23 and 28, 29 by the movement of the actuating shaft or lever of differential means $a$ and $b$.

Contacts 22 and 23 are connected to ground through battery 24 by wire 25. Arm 20 is connected to contact 28 by wire 30. Contact 29 is connected to battery 24 and ground by the junction 31 of wires 32 and 25. A cutout relay 34 for system C is grounded and connected to arm 26 by wire 33. Arm 21 is connected to contact 37 by wire 39. A cutout relay 42 for system B is connected to arm 35 and a cutout relay 44 for system A is connected to arm 36 by wire 43.

From the circuit of Fig. 2 it will be evident that if system A is in error and closes switches 26—28, 27—29, 35—37 and 36—38, only relay 44 will be across battery 24 to operate and cutout system A. The closed circuit for grounded relay 44 is wire 43, closed switch 36—38, wire 40, closed switch 27—29, wire 32, junction 31, wire 25, battery 24 and ground. The circuit for C relay 34 is open at switch 20—22 and the circuit for B relay 42 is open at switch 21—23. Only system A is cut out. In the same way only relay 42 operates for a failure in system B and only relay 34 operates for a failure in system C.

Figure 5:
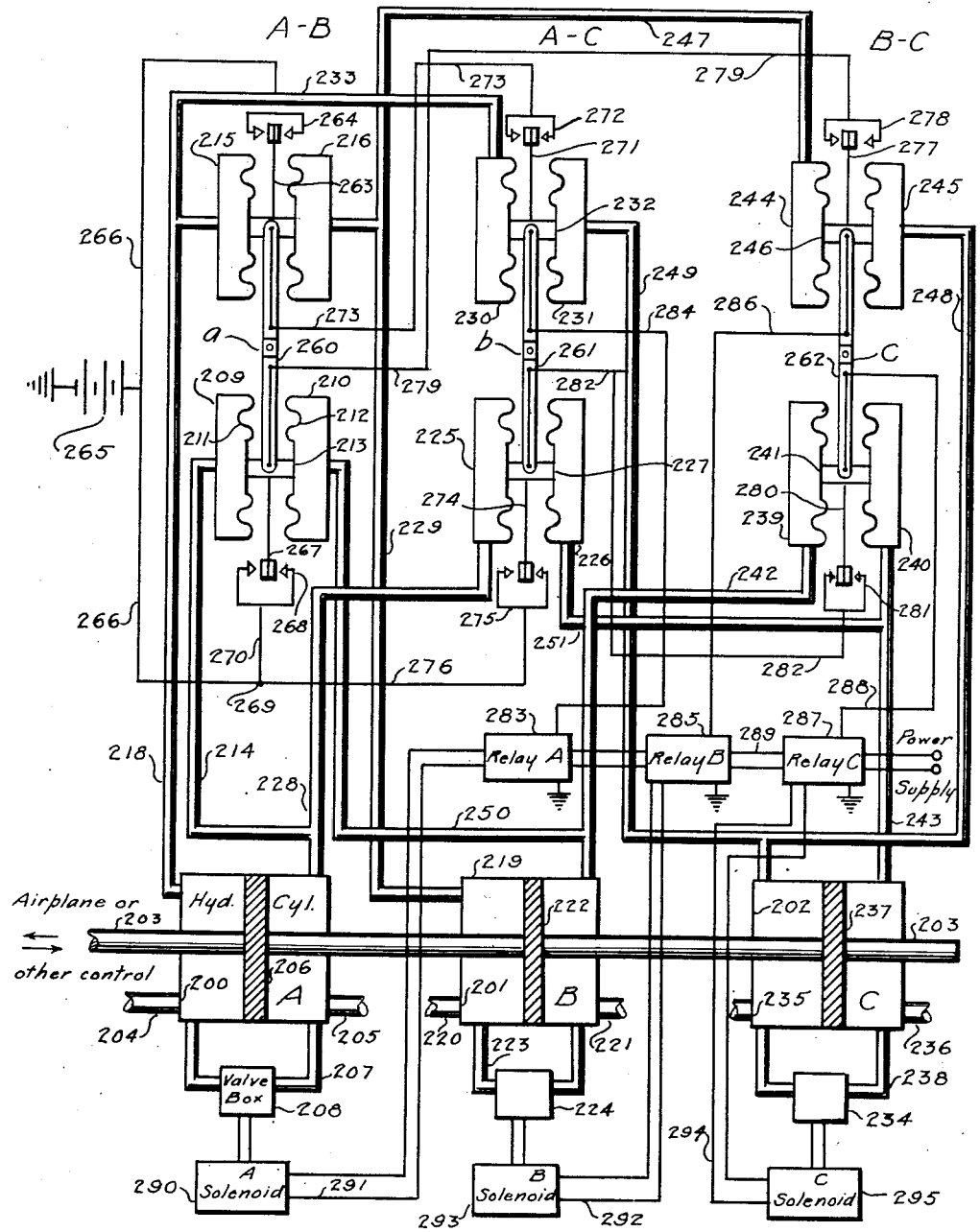
Fig. 5 is a schematic layout of a portion of one form of hydraulic system incorporating the invention.
Figure 9:
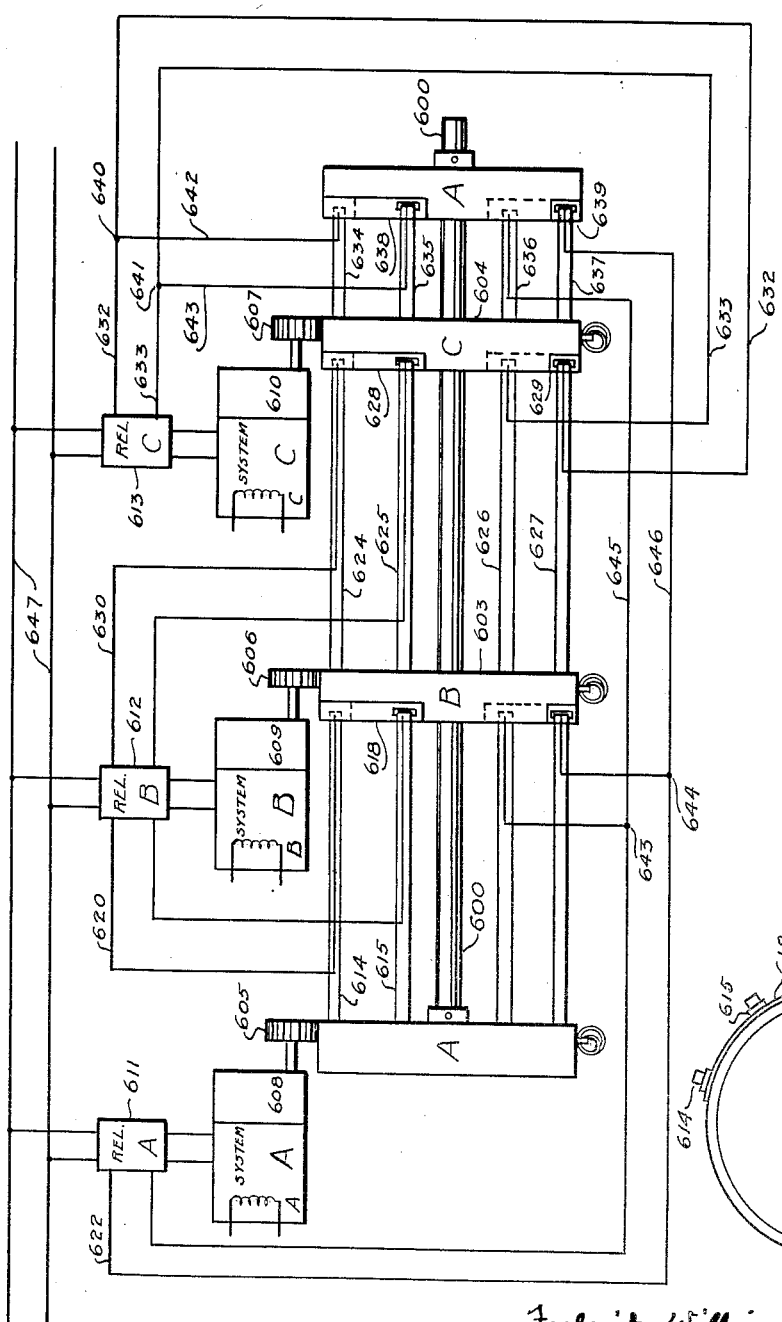
Fig. 9 is a modified form of control.
Figure 9A:
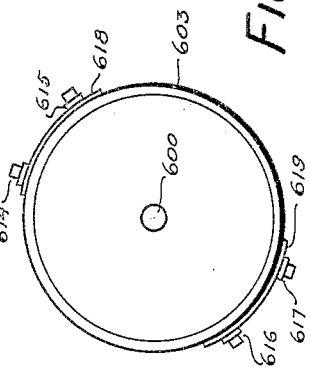
Fig. 9a is an enlarged detail of Fig. 9.

The operation of contacts 20, 21 by differential measuring means $a$, contacts 26, 27 by means $b$ and contacts 35, 36 by means $c$ through the action of spring biased shafts carrying the rotors of pairs of small torque motors, an armature and coil or the like has been mentioned. Relays 44, 42 and 34 operate to isolate or disconnect the respective systems A, B, and C by opening the signal output circuit for the one system found inaccurate, opening a by-pass valve as shown in Fig. 5 or disconnecting the system electrically as shown in Figs. 9, using magnetic clutches.

Figure 8:
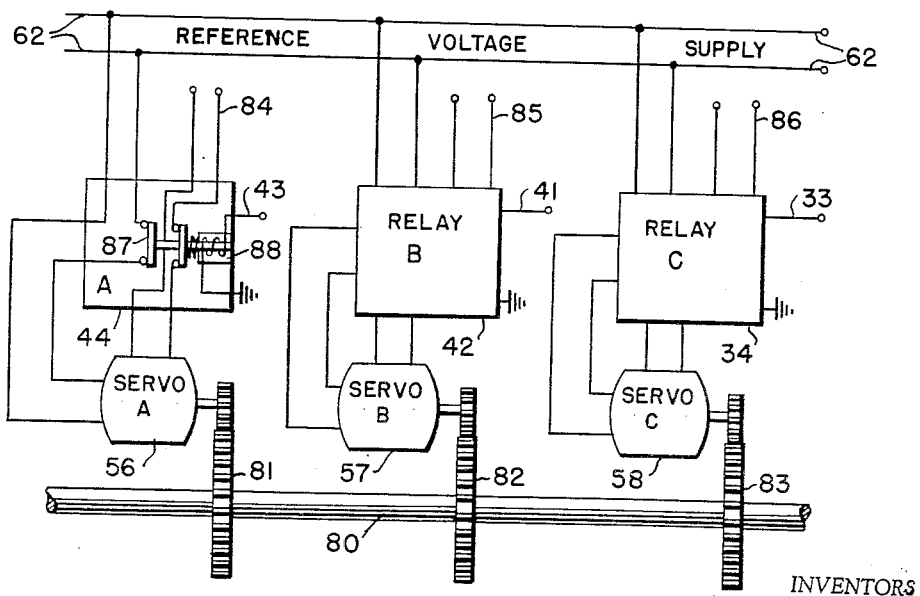
Fig. 8 is a schematic detail of one kind of relay operation of simple design.
Figure 6:
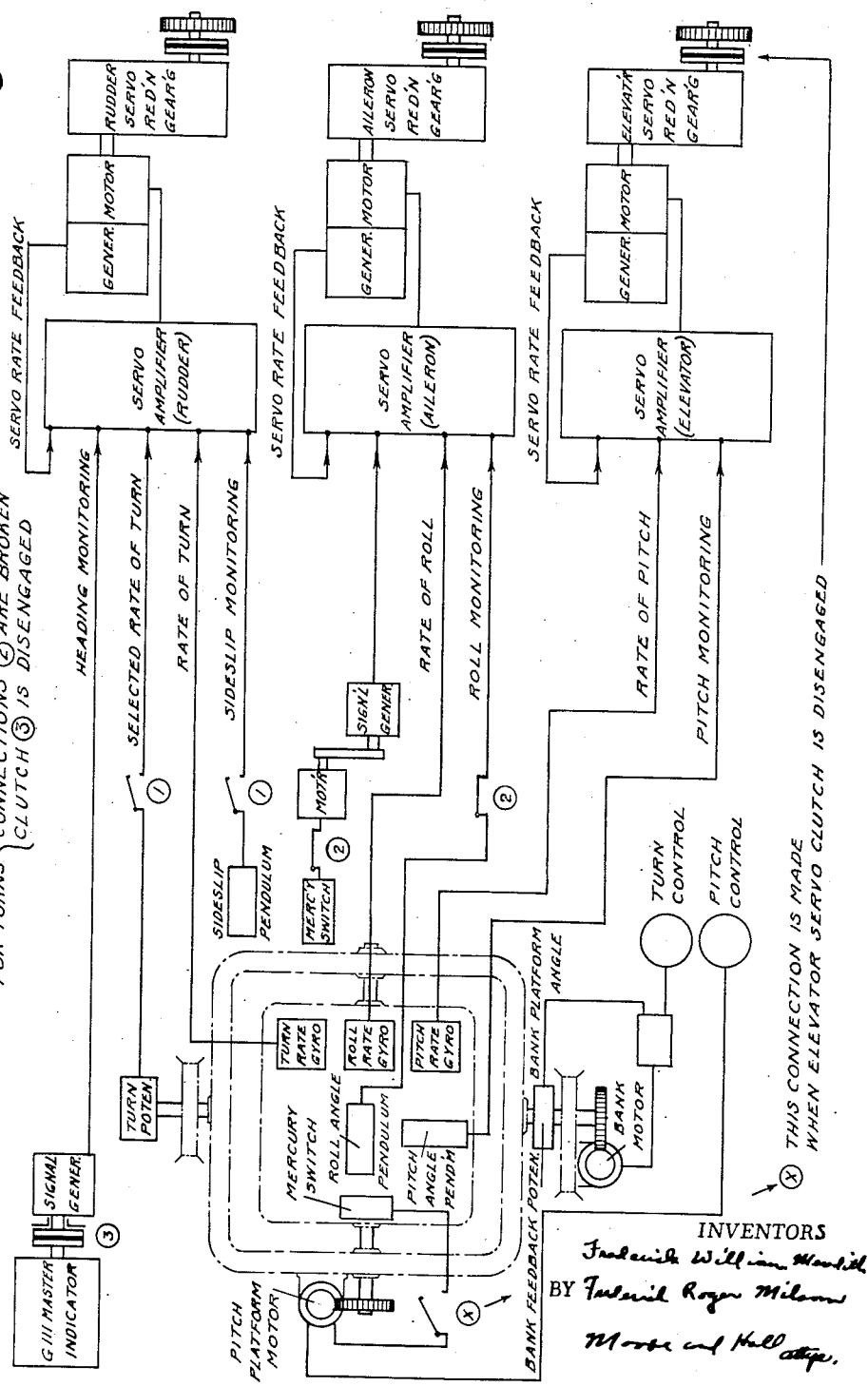
Fig. 6 is a circuit diagram of a single control system with check point monitors to cut out the system in the event error is detected.

In Fig. 8 is shown a simple diagram whereby the operation of relays 34, 42 and 34 of Fig. 2 may be clearly understood. As described above unbalance in any of the differential signal means $a$, $b$ or $c$ of Figs. 1, 1a and 2 energizes its respective relay 44, 42 or 34 to disconnect the faulty automatic pilot channel from control. If we assume the rudder signal channel of automatic pilot A in Fig. 8 sends an incorrect signal voltage to servo A56, so that it attempts to set a different course by rudder shaft 80 than the one called for by pilots B and C then it must follow that contacts 36, 38 and 27, 29 of Fig. 2 are closed completing the circuit from ground through relay 44, battery 24 and back to ground. As relay 44 is across battery 24 the coil 88 is energized and attracts armature 87 which is spring biased to close position. The attraction of armature 87 breaks the rudder signal channel circuit from automatic pilot A to servo 56 which no longer exerts any control force on rudder control shaft or rod 80. Relays 34 and 42 operate in the same manner to deactivate servos 58 and 57.

Where the standard reference points of test for failure of Fig. 6 are employed departure from the standard will close a set of contacts $a$, $b$ or $c$, as shown in Fig. 2, directly connected to the corresponding relay A, B or C, eliminating the failing system. This point check arrangement can be combined with the automatic pilot arrangement discussed in connection with Fig. 2, so that after the failure of one of three during a flight or other operation a second failure will not eliminate both remaining systems. This may be done by connecting the cutout relays so that the operation of one also cuts out the interlocking circuit of Fig. 3 and permits the two remaining systems to combine their end signals unless one system shows vital check point failure whereupon it is cut out, leaving the one system in full control.

Where the end signals of three systems A, B and C or more are compared they may be treated as described below.

Figure 7:
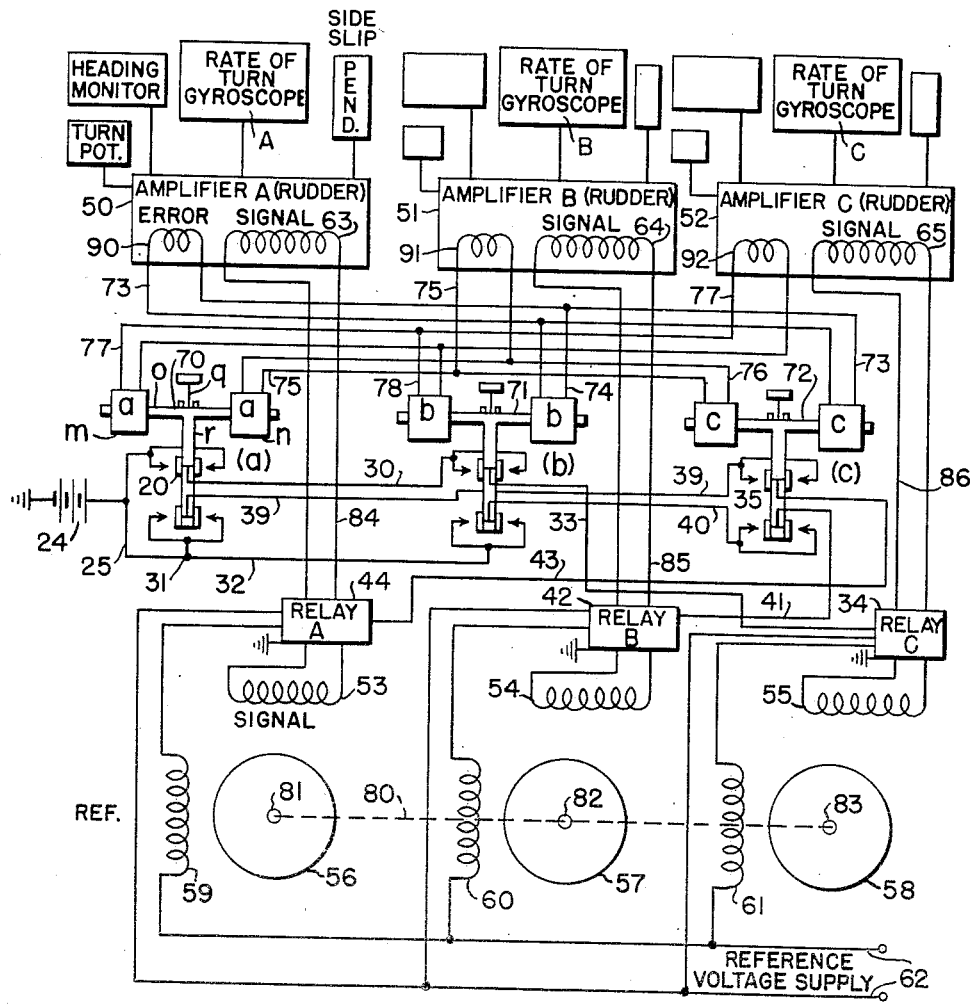
Fig. 7 is a schematic layout of the first discussed form of control.

Fig. 7 shows an electrical control employing three complete systems such as shown on gate fold page 12 of the publication cited above. Three separate servo rudder amplifiers A, B, and C, 50, 51 and 52 respectively, each receives, combines and amplifies the signals from its individual signal generator giving a heading monitoring signal, turn potentiometer giving the selected rate of turn, turn rate gyro giving the rate of turn signal and the side slip pendulum for a side slip monitoring signal.

Although Fig. 7 shows only the rudder amplifiers it will be understood that the invention contemplates three similar servo amplifiers for the ailerons each supplied by a mercury switch roll signal, roll rate gyro signal and a monitoring signal from a roll angle pendulum in addition to three servo amplifiers for the elevators supplied by a rate of pitch signal from a pitch rate gyro and a monitoring signal from a pitch angle pendulum.

Each rudder amplifier 50, 51 and 52 output supplies one phase 53, 54 and 55 of two phase motors 56, 57 and 58, respectively, with the rudder adjustment signal of its respective system. Motors 56, 57, and 58 may be connected as shown in copending U. S. application Serial Number 526,434, filed March 14, 1944, now U. S. Patent 2,512,665.

Each motor 56, 57 and 58 has a reference phase 59, 60 and 61, respectively, in quadrature with the corresponding signal phases 53, 54 and 55. Reference phase 59 of motor 56 is connected in parallel with reference phase 60 of motor 57 and reference phase 61 of motor 58 across reference voltage supply main 62.

Amplifier 50 has a signal output coil 63 connected to phase 53 of servo 56 by wires 84, amplifier 51 has signal output coil 64 connected to phase 54 of servomotor 57 by wires 85 and amplifier 52 has a signal output coil 65 connected to phase 55 of motor 58 by wires 86. Error pick up coils 90, 91 and 92 are in signal pickup relation with signal output coils 63, 64 and 65 respectively and connected to the differential comparison means of Fig. 3 combined with the error signal disconnecting circuit of Fig. 2.

As shown in Fig. 7 error coil 90 is connected to one side each of differential comparers 72 and 71 by wires 73 and 74. Error coil 91 is connected to one side each of differential comparers 70 and 72 by wires 75 and 76. Error coil 92 is connected to one side each of differential comparers 70 and 71 by wires 77 and 78.

Relays 44, 42 and 34 are spring biased to close both phase circuits of servos 56, 57 and 58, respectively. Each relay operates to open both phases of its respective motor when connected across battery 24 by the selective operation of the error signal disconnect circuit.

The rotors of servos 56, 57 and 58 are mechanically connected to rudder control shaft 80 either directly or by suitable gearing 81, 82 and 83.

Fig. 8 shows one arrangement for the relays 44, 42 and 34 in which both phases of the respective servo-motors are disconnected when the relay is connected across battery 24 by the action of spring biased armature 87 of solenoid 88. As shown armature 88 may have two sets of contacts, one set in each phase circuit of the corresponding servomotor. It will be understood that relays 44, 42 and 34 might just as readily be constructed to disconnect gearings 81, 82 and 83 respectively.

Fig. 5 which is an hydraulic counter-part of Figs. 2 and 3 shows a schematic arrangement by which the invention may be practiced with hydraulic means. Three independent control systems are connected to supply actuating cylinders 200, 201 and 202; A, B and C, respectively, with actuating fluid the pressure of which is determined by the desired amount of movement of aileron, elevator or rudder control shaft 203 which is on the aircraft and under the joint control of the three automatic pilot systems. It may be taken as an equivalent of shaft 98.

System A is provided with two small electric motor pumps which are controlled by the system and pump oil at a determined pressure or in a determined amount through pipe 204 or 205 as directed by the automatic pilot system. Oil is supplied under control by systems B and C in the same way.

Cylinder 200 of system A is provided with supply pipes 204 and 205 leading from the control portion of system A to supply fluid to act against diaphragm or piston 206 and move it to the right or left. The left and right portions of cylinder 200 are connected by pipe 207 normally closed by valve 208.

A pair of fluid chambers 209 and 210 have movable diaphragms 211 and 212 connected together by a bar 213. Chamber 209 is connected to the right side of cylinder 200 by a pipe 214. Another pair of fluid chambers 215 and 216 have their movable diaphragms connected by a bar 217. Chamber 215 is connected to the left side of hydraulic cylinder 200 by pipe 218.

Cylinder 201 of system B is provided with supply pipes 220 and 221 leading from the control portion of system B to supply fluid to act against piston 222 on shaft 203. The right and left portions of cylinder 201 are connected by pipe 223 normally closed by valve 224.

A pair of fluid chambers 225 and 226 have movable diaphragms connected by a bar 227. Chamber 225 is connected to the right side of cylinder 200 pipe 228 branching off pipe 214. Chamber 216 is connected to the left side of cylinder 219 by pipe 229. Another pair of fluid chambers 230 and 231 have movable diaphragms connected by a bar 232. Chamber 230 is connected to the left side of cylinder 200 by pipe 233 branching off pipe 218.

Cylinder 202 of system C is provided with supply pipes 235 and 236 leading from the control portion of system C to supply fluid or gas to act on piston 237 on shaft 203. The left and right portions of cylinder 202 are connected by pipe 238 normally closed by valve 234.

A pair of fluid chambers 239 and 240 have movable diaphragms connected by bar 241. Chamber 239 is connected to the right hand portion of cylinder 201 by pipe 242. Chamber 240 is connected to the right hand portion of cylinder 202 by pipe 243. Another pair of chambers 244 and 245 have diaphragms connected by bar 246. Chamber 244 is connected to the left side of cylinder 201 by a pipe 247 branching off pipe 229. Chamber 245 is connected to the left side of cylinder 202 by pipe 248 which joins with pipe 249 connected to chamber 231.

Chamber 210 is connected to the right side of cylinder 201 by pipe 250 branching off pipe 242. Chamber 226 is connected to the right side of cylinder 202 by pipe 251 branching off pipe 243.

It will be seen that chambers 209 and 210 balance the pressures in the right sides of cylinders 200 and 201 or the pressure signals from systems A and B tending to move shaft 203 to the left. Chambers 209 and 210 move bar 213 to the left if signal pressure A in the right side of cylinder 200 is less than the signal pressure B in the right side of cylinder 201. The A and B control signals are compared and if they are the same and yield equal pressures as they should then they balance out and bar 213 remains stationary. In the same way chambers 215 and 216 compare the pressure signals of systems A and B for right adjustment of shaft 203. Chambers 230 and 231 compare the pressure signals for right adjustment and chambers 225 and 227 compare for left adjustment of shaft 203 by systems A and C.

Chambers 244 and 245 compare pressure signals for right adjustment and chambers 239 and 240 compare for left adjustment of shaft 203 by systems B and C. As shown in Fig. 5 the chambers are positioned in A—B, A—C, and B—C groups depending upon whether they are affected by the various systems.

If pressure signal A differs from B and C, the A—B and A—B groups of chambers will move leaving the B—C group balanced and stationary. The others operate in the same maner as explained below. Where failure of a system is indicated by a unique pressure signal as in A just described it is necessary to open the corresponding valve 208, relieve the pressure on piston 206 through by-pass pipe 207 and exclude system A from control function to eliminate the introduction of error.

To accomplish the above, the mid-points of bars 213 and 217 are pivoted to an elongate rod 260 pivoted at its center to the frame or other base. In the same manner a rod 261 is pivoted to bars 227 and 232 and a rod 262 is pivoted to bars 241 and 246. A contact arm 263 projects from the upper end of rod 260 and extends between double contacts 264 connected to ground through battery 265 by wire 266. A contact arm 267 projects from the lower end of rod 260 and extends between double contacts 268 connected to junction 269 with wire 266 by wire 270.

A contact arm 271 projects from the upper end of rod 261 and extends between double contacts 272 connected to contact arm 263 by a wire 273. A contact arm 274 projects from the lower end of rod 261 and extends between double contacts 275 connected to junction 269 with wire 266 by a wire 276. Contacts 275 are connected to ground through battery 265.

A contact arm 277 projects from the upper end of rod 262 and extends between double contacts 278 connected to contact arm 267 by wires 279. A contact arm 280 projects from the lower end of rod 262 and extends between double contacts 281 connected to contact arm 274 by wire 282.

Contact arm 271 is connected to relay A, 283, by wire 284. Contact arm 277 is connected to relay B, 285, by wire 286 and contact arm 280 is connected to relay C, 287, by wire 288. Relays 283, 285 and 287 are each grounded and connected to power supply 289 in parallel. Relay 283 is connected to solenoid 290 by wires 291. Solenoid 290 is arranged to open valve 208 when it is placed across line 289 by relay 283. In the same manner wires 292 connect relay 285 and solenoid 293; wires 294 connect relay 287 and solenoid 295. Solenoid 293 is arranged to open valve 224 when relay 285 operates and solenoid 295 is arranged to open valve 234 when relay 287 operates. The solenoids are spring return and close their respective valves when they are deenergized.

From the above it may be seen that when the fluid pressure from system A entering pipe 204 or 205 differs from that of system B entering pipes 220 or 221 and from that of system C entering pipes 235 or 236, respectively, unbalance occurs in chamber groups A—B and A—C, leaving chamber groups B—C balanced. This assumes the probability of simultaneous failure of two systems of A, B and C to be negligible. The unbalance of A—B and A—C groups closes contacts 264, 268, 272 and 275, leaving contacts 278 and 281 open. Relay 283 is placed across battery 265 through the closed circuit of wire 284, arm 271, contacts 272, wire 273, arm 263, contacts 264, wire 266, battery 265, ground and back to relay 283. Relay 283 closes and operates solenoid 290 which opens valve 209 and causes pipe 207 to by-pass fluid pressure around piston 206 which is therefore inoperative, excluding the error in the signal from system A from shaft 203. The circuit of relay 285 is open at contacts 278 and the circuit of relay 287 is open at contacts 281, leaving valves 224 and 234 closed and the pressures in pipes 220 and 235 or 221 and 236 operative on shaft 203. In the same way when the signal from system B is unique chamber groups A—B and B—C are unbalanced, leaving group A—C balanced and operating relay 285 and valve 224. Where the signal from system C is unique groups A—C and B—C are unbalanced, leaving group A—B balanced and operating relay 287 and valve 234.

Fig. 6 shows the supplemental check point system employed in duplicate in one form of the invention or in conjunction with the three system control. Fig. 6 is a schematic representation of an automatic pilot control system taken from the publication referred to above. Switches 300, 301, 302, 303 and 304 are all connected in parallel across lines 305 and 306 containing battery 307 and magnetic clutch cutout relay 308. The closing of any one of the switches operates relay 308 and cuts out the system motor. Switch 300 is controlled by a volt meter coil which checks supply voltages at critical points. Switches 301–304 inclusive close in response to a sudden large increase in signal amplitude above that which is normal for continuing flight which has substantial duration. Relay 308 is slugged to prevent transient operation and may be reset automatically after a suitable delay period. Switches 301, 302, 303 and 304 may be used to check any point where a standard is available.

Switches 309 and 310 are similar to switch 300. Switches 311, 312, 313, 314 and 315 resemble switches 301–304.

The selection of check points for basic error source in a system can lead to many complications if it is attempted to make such checks complete. In general however there are four methods which are not too complicated and which will work together.

One, the basic voltage supplies may be checked by circuit opening voltmeters which break the control system circuit if the system supply voltage departs too much from standard.

Two, tube currents may be checked by circuit opening milliammeters which break the control system circuit if the plate current of a tube departs from standard by more than an acceptable amount.

Three, the control system circuit may be broken by series relays which open in response to open circuits which may occur in such units as the main feed back tachometer generator. Such series relays check closed circuits which are fatal if open.

Four, a pilot signal of say forty C. P. S. may be fed into a circuit to be checked such as the main amplifiers 50, 51 and 52, as shown in copending application Serial Number 53,935, filed October 11, 1948. The forty cycle or similar signal is chosen so as not to affect the operation of the unit being checked. The resulting signal output is filtered and the forty cycle signal output is compared with the input. Where fatal difference is established the system is cut out.

It is to be understood that these last four means are to be used singly or in combination to remove a faulty system from control function where the comparison principle can no longer operate as where only two systems are left in control due to previous failure of one or more on a long trip or under battle or emergency conditions.

Figure 11:
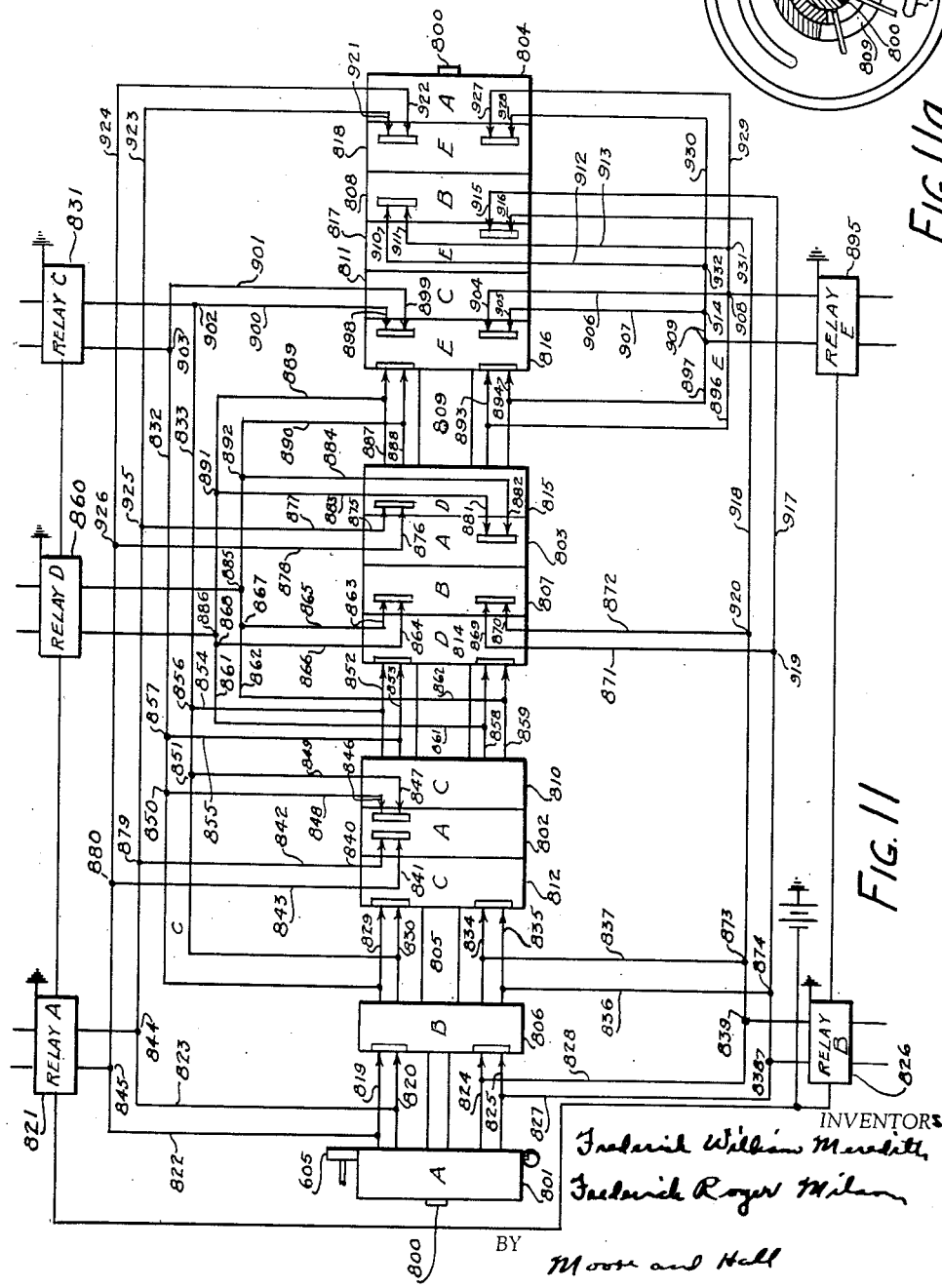
Fig. 11 is one form of five system control.

Figs. 9, 10 and 11 incl., compare the control signals from the rudder, aileron or elevator control channels directly by comparing the actual mechanical displacement of the servos concerned for three, four and five separate independent automatic pilot systems respectively. Each signal channel supplies a control voltage independently determined by the corresponding auto-pilot system to a small servo-motor which moves through a corresponding number of degrees. Each system is supplied with a wheel and all the wheels have an initial position which energizes all the relays controlling the drive connections for control and gives all the pilots equal control of the control shaft. If the signals are all the same all of the wheels rotate an equal amount and so maintain their original relationship. If, however, one signal differs from the others its corresponding wheel moves through a different angle from the others. If this difference in angular movement is great enough a circuit is broken and the corresponding relay opens deactivating the system sending the unique signal. In Fig. 9 the control signals are supplied to the coils shown with lead in wires of the respective systems A, B and C. These coils correspond to coils $m$, $n$ and the third one not shown in Fig. 3.

Figs. 10 and 11 on the other hand have simple relay switches which are placed in series with the control circuit of each corresponding system. A unique signal rotates the corresponding wheels a different amount than the other wheels thus breaking the circuit to the corresponding relay which opens and breaks the circuit of the corresponding servo and removes it from control. All of the relays are self-setting and re-establish control as soon as the control signals all agree within the selected tolerance as a limit. A telltale or manual reset relay can be used if it is desired to check on intermittent failure in service of any one pilot system.

Fig. 9 shows a direct comparison form which eliminates the need for extra motors. A shaft 600 has wheels 601 and 602 keyed thereto. Wheels 603 and 604 turn freely on shaft 600, but are held in longitudinal position by suitable means such as collars or the like. Wheels 601, 603 and 604 are spring biased and acted on by pinions 605, 606 and 607 of torque motors 608, 609 and 610 respectively. Torque motors 608, 609 and 610 are connected in parallel with the servomotors of their respective systems A, B and C which are provided with cut out relays 611, 612 and 613.

Wheel 601 is provided with two pairs of contact bars 614, 615 and 616, 617 which have contact shoes riding on connecting plates 618 and 619 on wheel 603. The contact shoes of arms 614 and 615 are connected to relay 612 by wires 620 and 621. Arms 616 and 617 ride on connecting plate 619 and are connected by wires 622 and 623 to relay 611.

Wheel 603 has arms 624, 625 and 626, 627 in pairs each with contact shoes siding on connecting plates 628 and 629 respectively. The contact shoes of arms 624 and 625 are connected to relay 612 by wires 630 and 631. The contact shoes of arms 626 and 627 are connected to relay 613 by wires 632 and 633. Wheel 604 has arms 634, 635 and 636, 637 in pairs each with contact shoes riding on connecting plates 638 and 639, respectively, on wheel 602. The contact shoes of arms 634, 635 are connected to junctions 640, 641 with wires 632 and 633 by wires 642 and 643. The contact shoes of arms 636 and 637 are connected to junctions 643 and 644 with wires 622 and 623 by wires 645 and 646. The relays are connected to a suitable power supply such as line 647.

As long as all three pinions 605, 606 and 607 rotate in unison then wheels 601, 602, 603 and 604 rotate together, all the pairs of contact shoes stay on their respective connecting plates and all the relay circuits are closed. Should system B fail, torque motor 609 and pinion 606 would experience unique motion and one of the contact shoes of arms 614, 615 would leave connecting plate 618 breaking the circuit of wires 620 and 621 to B relay 612. In the same way the circuit of wires 622 and 623 to A relay 611 is broken. As arms 624, 625, 626 and 627 are carried by wheel 603 controlled by pinion 606 then one of the contact shoes of each of these pairs of arms leaves its connecting plate 628 and 629, respectively. This action breaks the circuit of wires 630 and 631 to B relay 612 and the circuit of wires 632 and 633 to C relay 613. A relay 611 is held by the closed circuit of wires 645 and 646 connected to junctions 643 and 644, C relay 613 is held by the closed circuit of wires 642, 643 connected to junctions 640 and 641. As both circuits 620, 621 and 630, 631 to B relay 612 are broken, relay 612 releases and removes system B from control function on shaft 98. A and C relays 611 and 613 operate in the same way. Wheel 602 rotates with wheel 601 and is in all respects a system A wheel.

Fig. 10 is an arrangement for utilizing four automatic pilot systems and is an extension of the concept of Fig. 9. Shaft 700 has A wheels 701, 702 and 703 fastened thereto and controlled by pinion 605 of system A. A cylindrical shaft 704 surrounds a portion of shaft 700 and connects D wheels 705 and 706 controlled by pinion 707 of system D. B wheels 708 and 709 ride freely on shafts 700 and 704 with D wheel 705 between them. B wheels 708 and 709 are primed together by rods which ride in arc slots 710 in D wheel 705. Pinion 606 of system B controls the position of B wheels 708 and 709.

C wheels 711 and 712 are pinned through arc slots 710 in A wheel 702 and ride freely on shaft 704 under the control of system C pinion 607. Shaft 704 is double slotted as at 713 in Fig. 10a so as to permit A wheel 702 to be pinned to shaft 700 by rod 714 and rotate through a ninety degree arc differential.

A wheel 701 has arms 715 and 716 riding on connecting plate 717 on B wheel 708. Arms 715 and 716 are connected to system A cut out relay 718 by wires 719, 720. Wheel 701 has a second pair of arms 721 and 722 riding on connecting plate 723 on wheel 708 and connected to system B relay 724 by wires 725 and 726. B wheel 708 has a pair of arms 727 and 728 riding on connecting plate 729 on D wheel 705 and connected to system D relay 730 by wires 731 and 732. Wheel 708 has a second pair of arms 733 and 734 riding on connecting plate 735 on D wheel 705 and connected to system B relay 724 by wires 736 and 737 connected to junctions 738 and 739 with wires 725 and 726. B wheel 709 has a pair of arms 740 and 741 riding on connecting plate 742 on C wheel 711 and connected to B relay 724 by wires 743 and 744 leading to junctions 738 and 739. Wheel 709 has a second pair of arms 745 and 746 riding on plate 747 on wheel 711 and connected to system C relay 748 by wires 749 and 750.

C wheel 711 has one pair of arms 751 and 752 riding on connecting plate 753 on A wheel 702 and connected to A relay 718 by wires 754 and 755 and junctions 756 and 757 with wires 754 and 755 and junctions 756 and 757 with wires 719 and 720. Wheel 711 has another pair of arms 758 and 759 riding on connecting plate 760 and connected to C relay 748 by wires 761 and 762 leading to junctions 763 and 764 with wires 749 and 750.

C wheel 712 is pinned to and turns with C wheel 711 and carries a pair of arms 765 and 766 riding on connection plate 767 on D wheel 706. Arms 765 and 766 are connected to D relay 730 by wires 768 and 769 leading to junctions 770 and 771 with wires 731 and 732. Wheel 712 carries a second pair of arms 772 and 773 riding on plate 774 on D wheel 706 and connected to C relay 748 by wires 775 and 776 leading to junctions 777 and 778 with wires 749 and 750.

D wheel 706 carries a pair of arms 779 and 780 riding on plate 781 on A wheel 703 and connected to A relay 718 by wires 782 and 783 leading to junctions 784 and 785 with wires 754 and 755. Wheel 706 carries another pair of arms 786 and 787 riding on connection plate 788 on A wheel 703 and connected to D relay 730 by wires 789 and 790 leading to junctions 770 and 771.

Relays 718, 724, 730 and 748 are grounded and supplied with power from battery 791 by wire 792.

System A relay 718 is connected across arms 715 and 716 for A—B control signal comparison, across arms 751 and 752 for A—C comparison and across arms 779 and 780 for A—D comparison. All of these connection circuits must be broken by differential rotation of pairs of wheels 701 and 708, 702 and 711, and 703 and 706 to release A relay 718 and remove system A from control function.

If desired once relay 718 cuts out it may automatically lock out for a predetermined period or require manual resetting to prevent possible random accelerations which might otherwise be applied to shaft 98 as the remaining B, C and D wheels rotate and momentarily close the circuit of A relay 718.

Once a relay 718 locks out and disconnects system A, the remaining systems B, C and D operate in the same manner as Fig. 9. Should system D also fail and be locked out in turn by relay 730 then systems B and C are left in control subject to the standard checks referred to in connection with Fig. 6. Otherwise should systems B and C differ in control signal by an amount greater than the tolerance determined by the length of connection strips 742 and 747 both systems B and C would lock out and there would be no control. This unlikely event could happen where the controls are subject to shell fire. As long as there is one system which may possibly be right the standard check switches 300–304 inclusive are intended to permit it to operate. Of course switches 300–304 will be useless where advantage is taken of the four plus system to reduce the size and weight of the control actuating elements such as servomotors and the like so that two or more motors etc. are required to actuate shaft 98.

Relays 724, 730 and 748 operate in the same manner as A relay 718. When relay 718 is out the circuit of arms 721 and 722 for B relay 724 is open, but the arms 740, 741 and arms 733, 734 are closed and system B is kept in service. For C relay 748 arms 758, 759 are open and the relay remains closed because of the closed circuits of arms 745, 746 and 772, 773.

Fig. 11 shows one form of a five system control and is presented as illustrative of the possibilities of increasing the number to eight or more if desired. This could be done by auxiliary shafts to bridge intermediate wheels. Also each pair of arms may well be replaced with a light beam and the connection plates replaced by a light sensitive cell to which the leads are attached. The wheels may be supplied with suitably placed holes and lenses to perform the bridging function.

Shaft 800 carries A wheels 801, 802, 803 and 804 fastened thereto. Shaft 805 surrounds a portion of shaft 800 and carries B wheels 806, 807 and 808 fastened thereto. Shaft 809 surrounds a portion of shaft 805 and carries C wheels 810 and 811 fastened thereto. C wheel 812 is pinned to wheel 810 through arcuate slots 813 in A wheel 802. D wheels 814 and 815 run freely on shaft 809 and are pinned together through slots 813 in wheels 803 and 807. E wheels 816, 817 and 818 run freely on shafts 809, 805 and 800, respectively, and are pinned together through slots 813 in wheels 808 and 811. A wheel 801 and shaft 800 are driven by the system A torque motor and pinion as in Figs. 9 and 10. The B, C, D and E wheels are driven in the same manner by their respective system pinions.

A wheel 801 carries pair of arms 819 and 820 riding on a connection plate and connected to system A relay 821 by wires 822 and 823. Wheel 801 also carries pair of arms 824 and 825 riding on a plate on wheel 806 and connected to B relay 826 by wires 827 and 828.

B wheel 806 carries a pair of arms 829 and 830 riding on a connection plate on C wheel 812 and connected to C relay 831 by wires 832 and 833. Wheel 806 carries a second pair of arms 834 and 835 riding on a connection plate on C wheel 812 and connected to B relay 826 by wire 836 and 837 leading to junctions 838 and 839 with wires 827 and 828.

C wheel 812 carries a single pair of arms 840 and 841 riding on a connection plate on A wheel 802 and connected to A relay 821 by wires 842 and 843 leading to junctions 844 and 845 with wires 822 and 823. C wheel 810 carries a pair of arms 846 and 847 riding on a connection plate on A wheel 802 and connected to C relay 831 by wires 848 and 849 leading to junctions 850 and 851 with wires 832 and 833. Wheel 810 carries a pair of arms 852 and 853 riding on a connection plate on D wheel 814 and connected to C relay 831 by wires 854 and 855 leading to junctions 856 and 857 with wires 832 and 833. Wheel 810 carries a third pair of arms 858 and 859 riding on a connection plate on D wheel 814 and connected to D relay 860 by wires 861 and 862.

D wheel 814 carries a pair of arms 863 and 864 riding on a connection plate on B wheel 807 and connected to D relay 860 by wires 865 and 866 leading to junctions 867 and 868 with wires 861 and 862. Wheel 814 carries another pair of arms 869 and 870 riding on B wheel 807 and connected to B relay 826 by wires 871 and 872 leading to junctions 873 and 874 with wires 836 and 837.

A wheel 803 carries a pair of contact arms 875 and 876 riding on a contact plate on D wheel 815 and connected to A relay 821 by wires 877 and 878 leading to junctions 879 and 880 with wires 842 and 843.

D wheel 815 carries a pair of contact arms 881 and 882 riding on a connection plate on A wheel 803 and connected to D relay 860 by wires 883 and 884 leading to junctions 885 and 886 with wires 861 and 862. Wheel 815 carries another pair of contact arms 887 and 888 riding on a connection plate on E wheel 816 and connected to D relay 860 by wires 889 and 890 leading to junctions 891 and 892 with wires 883 and 884. Wheel 815 carries a third pair of contact arms 893 and 894 riding on a connection plate on E wheel 816 and connected to E relay 895 by wires 896 and 897.

C wheel 811 carries a pair of contact arms 898 and 899 riding on a connection plate on E wheel 816 and connected to C relay 831 by wires 900 and 901 leading to junctions 902 and 903 with wires 832 and 833. Wheel 811 carries another pair of contact arms 904 and 905 riding on a contact plate on wheel 816 and connected to E relay 895 by wires 906 and 907 leading to junctions 908 and 909 with wires 896 and 897.

E wheel 817 carries a pair of arms 910 and 911 riding on a connection plate on B wheel 808 and connected to E relay 895 by wires 912 and 913 leading to junctions 914 and 908 with wires 906 and 907. B wheel 808 carries a pair of contact arms 915 and 916 riding on a connection plate on wheel 817 and connected to B relay 826 by wires 917 and 918 leading to junctions 919 and 920 with wires 871 and 872.

A wheel 804 carries a pair of contact arms 921 and 922 riding on a contact plate on E wheel 818 and connected to A relay 821 by wires 923 and 924 leading to junctions 925 and 926 with wires 877 and 878. Wheel 804 carries another pair of contact arms 927 and 928 riding on a contact plate on E wheel 818 and connected to E relay 895 by wires 929 and 930 leading to junctions 931 and 932 with wires 912 and 913.

Figure 11A:
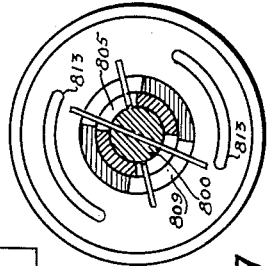
Fig. 11a is a section along line 11 of Fig. 11 with a part offset for clarity.

Fig. 11a shows one means of controlling A wheel 803 by pinning it to shaft 800 through diametrically opposite ninety degree slots in shafts 805 and 809. Rod 933 pins wheel 803 to shaft 800 and pins 934 fasten wheel 807 to shaft 805. Wheel 802 is treated as shown in Fig. 10a.

The relays of Fig. 11 are cut out in the same way as discussed in detail with Fig. 10. Each relay 821, 826, 831, 860 and 895 has four holding circuits all of which must be open before a relay will lock out and remove its system from control function.

Should system E fail and supply a unique signal E wheels 816, 817 and 818 would move relative to D wheel 815, C wheel 811, B wheel 808 and A wheel 804 which would display negligible relative movement as a group. This would remove the connection plates from across pairs of arms 887—888, 893—894, 898—899, 904—905, 910—911, 915—916, 921—922 and 927—928. All the holding circuits of E relay 895 have opened and the relay would release, removing system E from control. All the other relays remain closed as only one of four holding circuits has opened for each relay A, B, C and D. Here again the relays preferably lock out and progressive failures do not interfere with control down to any two systems.

It will be understood that the relays which disconnect the several servomotors may open their circuits as shown in Fig. 8, may disengage the gearing of Fig. 8 or may control magnetic clutches, as for example those shown in Fig. 2 of U. S. Pat. 907,711 to Anthony dated December 29, 1908.

The above specification describes what are at present believed to be the preferred embodiments of this invention. However, from reading the above it will be obvious to those skilled in the art that various modifications and changes may be made therein without departing from the invention. It is the purpose of the appended claims to cover in generic language all such changes and modifications as fall within the true spirit and scope of the invention.

We claim:

1. In a self-supervising aircraft control system having a small error probability, at least three independent automatic pilot means to determine the same control data, differential comparing means connected to said data determining means for comparing in pairs the data determined by said independent data determining means, an aircraft control surface actuator responsive to each automatic pilot means each said actuator constructed for actuation of the same aircraft control surface, deactivating means for each said actuator, each said deactivator means connected to and operated by an element of said differential comparing means in response to a signal resulting from a difference in data determination by a pair of data determining means and acting to deactivate that actuator which is responsive to the automatic pilot means causing a resultant signal in said differential comparing means.

2. The combination set forth in claim 1, a shaft for operating an aircraft control surface, each actuator being operatively connected to said shaft.

3. The combination set forth in claim 2, said differential comparing means comprising switch elements, means mounting said switch elements for movement relative to each other, said deactivator means being controlled by said switch elements.

4. In a self-supervising control system having a small error probability for the automatic control of a movable craft, rudder means to steer said craft on a desired course, situating means to move said rudder means to a desired course setting, at least three substantially independent control data determining means comprising automatic pilot means constructed to determine independent values of the same control data, differential comparison means connected to said control data determining means for comparing in pairs the data determined independently by each said control data determining means, means operatively connecting each said data determining means to said rudder actuating means, deactivating means controlled by said differential comparison means and connected to deactivate said means operatively connecting each said data determining means to said rudder actuating means, whereby a unique signal representing erroneous control data is removed from control function with respect to rudder actuating means.

5. In combination, a multiple channel safety control for a movable craft comprising at least three independent automatic pilot means for determination of correct control surface setting, positioning means connected to position the said control surface of the craft, at least three independent servo means operatively connected to said positioning means to position the said surface, each pilot means having signal output means for supplying operational signals to its corresponding servo means, signal data differential comparing means connected to said signal output means to compare the signal outputs of the several pilot means, signal data control elimination means connected to said signal data differential comparing means and actuated thereby to eliminate from active control of said positioning means that servo means actuated by a pilot means producing unique operational signals substantially at variance with at least two independent operational signals produced by said other independent pilot means.

6. The combination set forth in claim 5, said movable craft being an aircraft, said operational signals being rudder setting signals, said automatic pilot means also independently determining bank setting signals for the proper setting of ailerons of the movable craft, aileron positioning means connected to position the ailerons of said aircraft, at least three independent aileron servo means operatively connected to said aileron positioning means and constructed to receive their respective independent bank setting signal, aileron signal data differential comparing means connected to receive and to compare said bank setting signals in pairs, aileron signal data control elimination means connected to said aileron signal data differential comparing means and actuated thereby to eliminate from active control of said aileron positioning means that aileron servo means actuated by a pilot means producing unique operational aileron setting signals substantially at variance with at least two independent operational aileron setting signals produced by said other independent pilot means.

7. In combination in a multiple channel safety control for a movable craft, at least three independent signal producing means comprising pilot means to determine the same data for control of the craft, signal data comparing means connected to said signal producing means, signal data control elimination means connected to said data comparing means and actuated thereby to eliminate from active control of said craft that signal producing means which produces an operational signal determined to be erroneous.

8. The combination set forth in claim 7, said signal comparing means comprising signal receiving coils for at least two independent signals, movable differential means to compare said signals acting in response to forces exerted by the relative values of currents flowing in said signal receiving coils.

9. The combination set forth in claim 8, said signal data control elimination means comprising a plurality of contacts, said contacts being actuated by said differential means in response to said forces to affect the energy for the control of said craft supplied by one of said signal producing means.

10. In combination in a multiple channel safety control for a movable craft, at least three independent control signal determining auto pilot means to supply ideally identical data for the operating control of a craft, a control element for said craft, servo means for each control signal determining means, each servo-means being operatively connected to said control element, a relay in the supply circuit of each said servo and connected to receive the control signal from said signal determining means and means to supply a reference voltage to each of said relays whereby control data not in proper relation with a selected voltage will cause the corresponding relay to open the circuit of the corresponding servomotor and remove it from control function.

11. The combination set forth in claim 7, said signal data comparing means comprising two signal coils constructed to act in opposition on a movable member constructed to act to close contact elements on said signal data control elimination means.

12. The combination set forth in claim 7, said signal data comparing means comprising opposed expansible chamber means connected to control pressures from separate control means, said signal data control elimination means comprising movable contact elements actuated by movement of said expansible chamber means.

13. The combination set forth in claim 7, said signal data control elimination means comprising movable circuit affecting elements, a circuit corresponding to each element and arranged to be affected thereby whereby a difference in movement of one of said elements with respect to the others of said lements affects the corresponding circuit and isolates the said corresponding signal producing means determined to be in error.

14. In a self-supervising aircraft control system having a small error probability, three or more independent automatic pilot means to determine the same control data, pairs of means each responsive to two of said pilot means and connected for comparing the data so determined, controlled means corresponding to said pilot means and selective error disconnecting means responsive to said pairs of means and connected to said controlled means to render a selected controlled means inoperative and to remove said selected controlled means for functional operation by disconnecting it.

15. The combination set forth in claim 14, each said automatic pilot means having separate check means connected to check values at selected points, compare them with a predetermined standard and cut out the individual system containing values which fail to check correctly.

16. The combination set forth in claim 14, having four or more said automatic pilot means.

17. The combination set forth in claim 14, having at least five said automatic pilot means of relatively small size whereby the total weight of the self-supervising control system can be decreased.

18. The combination set forth in claim 7, said safety control system being constructed to navigate said craft in three dimensions with very small error probability, each said automatic pilot means comprising a plurality of gyroscopes mounted to detect angular acceleration about at least two axes of the craft.

References Cited in the file of this patent

UNITED STATES PATENTS

| Number | Name | Date |
|---|---|---|
| 1,215,815 | Kaminski et al. | Feb. 13, 1917 |
| 2,077,179 | Mosley et al. | Apr. 13, 1937 |
| 2,315,110 | Dornier | Mar. 30, 1943 |

FOREIGN PATENTS

| Number | Country | Date |
|---|---|---|
| 344,149 | Great Britain | Mar. 5, 1931 |